US010765898B2

(12) United States Patent
Abernathy et al.

(10) Patent No.: US 10,765,898 B2
(45) Date of Patent: Sep. 8, 2020

(54) STEEL COATED METAL STRUCTURES AND METHODS OF FABRICATING THE SAME

(71) Applicant: Bull Moose Tube Company, Chesterfield, MO (US)

(72) Inventors: Mark Scott Abernathy, Ballwin, MO (US); Marlon Edwin Robinson, Lake Saint Louis, MO (US)

(73) Assignee: Bull Moose Tube Company, Chesterfield, MO (US)

( * ) Notice: Subject to any disclaimer, the term of this patent is extended or adjusted under 35 U.S.C. 154(b) by 189 days.

(21) Appl. No.: 15/642,509

(22) Filed: Jul. 6, 2017

(65) Prior Publication Data

US 2018/0008851 A1    Jan. 11, 2018

Related U.S. Application Data

(60) Provisional application No. 62/359,452, filed on Jul. 7, 2016.

(51) Int. Cl.
*A62C 35/68*      (2006.01)
*C23C 28/02*      (2006.01)
(Continued)

(52) U.S. Cl.
CPC .............. *A62C 35/68* (2013.01); *A62C 35/58* (2013.01); *B32B 15/011* (2013.01); *C23C 10/02* (2013.01); *C23C 10/28* (2013.01); *C23C 10/60* (2013.01); *C23C 28/02* (2013.01); *C23C 28/021* (2013.01); *C23C 28/023* (2013.01); *F16L 9/02* (2013.01);
(Continued)

(58) Field of Classification Search
CPC ...... C23C 28/023; C23C 28/021; C23C 10/02; C23C 10/28; C23C 10/60; C23C 28/02; A62C 35/68; A62C 35/58; A62C 35/60; A62C 35/62; F16L 9/02; F16L 58/08;
(Continued)

(56) References Cited

U.S. PATENT DOCUMENTS 2,326,176 A  *  8/1943  Schierenbeck  .......... B01J 3/048
                                                    138/109
2,402,834 A     6/1946  Nachtman
(Continued)

FOREIGN PATENT DOCUMENTS

DE    102008048969 A1    12/2009
EP        0071261 A1     2/1983
(Continued)

OTHER PUBLICATIONS

International Search Report and Written Opinion, dated Sep. 11, 2017, for co-pending International Application No. PCT/US2017/040860 (12 pgs.).

*Primary Examiner* — Arthur O. Hall
*Assistant Examiner* — Steven M Cernoch
(74) *Attorney, Agent, or Firm* — Armstrong Teasdale LLP

(57) ABSTRACT

An elongated hollow component includes a body extending from a first end to a second end and defining a longitudinal axis. The body includes a plurality of layers each circumscribing the longitudinal axis. The plurality of layers includes a base layer including a first steel material, and an inner surface coating coupled to a radially inner surface of the base layer. The inner surface coating includes a second steel material.

15 Claims, 2 Drawing Sheets

(51) Int. Cl.
  *A62C 35/58* (2006.01)
  *C23C 10/60* (2006.01)
  *C23C 10/28* (2006.01)
  *B32B 15/01* (2006.01)
  *C23C 10/02* (2006.01)
  *F16L 9/02* (2006.01)
  *F16L 58/08* (2006.01)
  *A62C 35/60* (2006.01)
  *A62C 35/62* (2006.01)

(52) U.S. Cl.
  CPC ............. *F16L 58/08* (2013.01); *A62C 35/60* (2013.01); *A62C 35/62* (2013.01)

(58) Field of Classification Search
  CPC ......... F16L 1/206; F16L 13/14; B23B 15/011; B21B 1/42; B21B 13/18
  USPC ............... 29/895–895.33, DIG. 37, 890.141
  See application file for complete search history.

(56) References Cited

U.S. PATENT DOCUMENTS

| | | | |
|---|---|---|---|
| 3,066,403 A | 12/1962 | Brauchler | |
| 3,184,331 A | 5/1965 | Carter | |
| 3,294,498 A | 12/1966 | Carter | |
| 3,312,546 A | 4/1967 | Mayer et al. | |
| 3,340,054 A | 9/1967 | Ward et al. | |
| 3,403,988 A | 10/1968 | Carter | |
| 3,559,276 A | 2/1971 | Anderson | |
| 3,623,901 A | 11/1971 | Forstmann et al. | |
| 3,652,235 A | 3/1972 | Manilla et al. | |
| 3,753,704 A | 8/1973 | Manilla et al. | |
| 3,768,145 A * | 10/1973 | Ostrowski | B21C 37/09 29/33 K |
| 3,768,987 A | 10/1973 | Forstmann et al. | |
| 3,775,151 A | 11/1973 | Baker et al. | |
| 4,019,581 A * | 4/1977 | Diggs | A62C 35/58 169/16 |
| 4,026,583 A | 5/1977 | Gottlieb | |
| 4,162,758 A | 7/1979 | Mikarai | |
| 4,319,121 A | 3/1982 | Yoshida | |
| 4,455,352 A | 6/1984 | Ayres et al. | |
| 4,526,817 A | 7/1985 | Rausch et al. | |
| 4,542,846 A | 9/1985 | Matsui et al. | |
| 4,556,240 A | 12/1985 | Yoshida | |
| 4,784,311 A | 11/1988 | Sugao | |
| 4,847,965 A * | 7/1989 | Harwood | B21D 53/88 29/890.08 |
| 4,917,969 A | 4/1990 | Pircher et al. | |
| 5,265,793 A | 11/1993 | Usui et al. | |
| 5,320,388 A * | 6/1994 | Lacy | E21B 17/00 285/353 |
| 6,015,080 A | 1/2000 | Turner | |
| 6,042,153 A | 3/2000 | Delange et al. | |
| 6,085,800 A * | 7/2000 | Usui | F16L 9/04 138/142 |
| 6,273,474 B1 | 8/2001 | Delange et al. | |
| 6,293,311 B1 * | 9/2001 | Bushi | B29C 47/0023 138/138 |
| 6,322,907 B1 | 11/2001 | Hauser et al. | |
| 6,575,197 B2 * | 6/2003 | Esser | F16L 59/143 138/109 |
| 6,659,137 B2 * | 12/2003 | Imasaki | B21C 1/00 138/142 |
| 6,749,894 B2 | 6/2004 | Subramanian et al. | |
| 6,758,282 B2 * | 7/2004 | Pliner | A01N 33/12 118/306 |
| 6,786,389 B2 * | 9/2004 | Pursell | C22C 47/00 228/165 |
| 6,863,313 B1 | 3/2005 | Delange et al. | |
| 8,453,482 B2 * | 6/2013 | Maki | C23C 2/12 428/328 |
| 8,459,370 B2 * | 6/2013 | Orr | A62C 35/00 169/37 |
| 8,557,397 B2 | 10/2013 | Bullard et al. | |
| 8,608,875 B1 | 12/2013 | Bullard | |
| 8,628,861 B2 | 1/2014 | Bullard et al. | |
| 8,662,191 B2 * | 3/2014 | Orr | A62C 35/00 169/17 |
| 8,784,997 B2 | 7/2014 | Bullard et al. | |
| 8,790,790 B2 | 7/2014 | Bullard et al. | |
| 8,795,447 B2 | 8/2014 | Bullard et al. | |
| 8,962,154 B2 | 2/2015 | Yao et al. | |
| 9,316,341 B2 | 4/2016 | Kusinski et al. | |
| 9,333,727 B2 | 5/2016 | Bullard | |
| 2003/0178314 A1 | 9/2003 | Polinski et al. | |
| 2005/0150662 A1 * | 7/2005 | Bochan | A62C 35/58 169/16 |
| 2006/0257683 A1 | 11/2006 | Polinski et al. | |
| 2009/0224021 A1 * | 9/2009 | Jensen | B21D 43/022 226/183 |
| 2009/0308481 A1 * | 12/2009 | Xiao | B21B 1/42 138/142 |
| 2010/0012308 A1 | 1/2010 | Scheidegger et al. | |
| 2012/0160361 A1 * | 6/2012 | Fischer | B23K 31/027 138/145 |
| 2012/0199317 A1 | 8/2012 | Hartmann et al. | |
| 2012/0204992 A1 | 8/2012 | Park et al. | |
| 2013/0220523 A1 | 8/2013 | Cheney et al. | |
| 2013/0309410 A1 | 11/2013 | Bullard et al. | |
| 2014/0050937 A1 | 2/2014 | Bullard | |
| 2015/0132177 A1 | 5/2015 | Yazawa et al. | |
| 2015/0167131 A1 | 6/2015 | Bullard et al. | |
| 2015/0345041 A1 | 12/2015 | Ilgar et al. | |
| 2016/0010170 A1 | 1/2016 | Thomas et al. | |

FOREIGN PATENT DOCUMENTS

| | | |
|---|---|---|
| EP | 0944443 A1 | 9/1999 |
| EP | 1118355 A1 | 7/2001 |
| GB | 1443172 A | 7/1976 |
| WO | 9825712 A1 | 6/1998 |
| WO | 2013172941 A1 | 11/2013 |
| WO | 2014169365 A2 | 10/2014 |
| WO | 2014169367 A2 | 10/2014 |

* cited by examiner

US 10,765,898 B2

STEEL COATED METAL STRUCTURES AND METHODS OF FABRICATING THE SAME

CROSS REFERENCE TO RELATED APPLICATIONS

This application claims the benefit and priority of U.S. Provisional Application Ser. No. 62/359,452 filed Jul. 7, 2016, entitled "STAINLESS STEEL COATED STRUCTURES AND METHODS OF FABRICATING THE SAME," the entirety of which is hereby incorporated by reference.

BACKGROUND

The field of this disclosure relates generally to metal structures and, more particularly, to a metal structure having a coating.

Many known structures are made of a less expensive metal material that is generally suited for the structure's use in the field, but has at least one undesirable surface property. For example, some known structures are made entirely of a metal material having an increased susceptibility to corrosion, and other known structures are made entirely of a metal material having an increased surface roughness. In many instances, a different metal material (e.g., stainless steel) may be better suited for the structure's use in the field, but it may be too costly to fabricate the entire structure from such a material. It would be useful, therefore, to provide a structure having a base that is made of the less expensive metal material, and a surface coating that is made of the more expensive metal material, thereby making the structure better suited for its field of use in a more cost-effective manner.

BRIEF DESCRIPTION

In one aspect, an elongated hollow component is provided. The elongated hollow component includes a body extending from a first end to a second end and defining a longitudinal axis. The body includes a plurality of layers each circumscribing the longitudinal axis. The plurality of layers includes a base layer including a first steel material, and an inner surface coating coupled to a radially inner surface of the base layer. The inner surface coating includes a second steel material.

In another aspect, a fire suppression sprinkler system is provided. The system includes a plurality of pipes. Each of the pipes includes a body extending from a first end to a second end and defining a longitudinal axis. The body includes a plurality of layers each circumscribing the longitudinal axis. The plurality of layers includes a base layer including a first steel material, and an inner surface coating coupled to a radially inner surface of the base layer. The inner surface coating includes a second steel material. The system also includes at least one sprinkler head coupled in flow communication to the plurality of pipes.

In yet another aspect, a method of fabricating an elongated hollow component is provided. The method includes coupling an inner surface coating to a base layer to form a plurality of layers. The base layer is formed from a first steel material and the inner surface coating is formed from a second steel material. The method also includes forming the plurality of layers into a body of the elongated hollow component, such that the plurality of layers each circumscribe a longitudinal axis extending from a first end to a second end of the body, and the inner surface coating is on a radially inner surface of the base layer.

DETAILED DESCRIPTION

The following detailed description illustrates steel coated structures and methods of fabricating the same by way of example and not by way of limitation. The description should enable one of ordinary skill in the art to make and use the structures, and the description describes several embodiments of structures, including what is presently believed to be the best modes of making and using the structures. Exemplary structures are described herein as being used in a fire suppression sprinkler system. However, it is contemplated that the structures have general application to a broad range of systems in a variety of fields other than fire suppression sprinkler systems.

Figure 1:
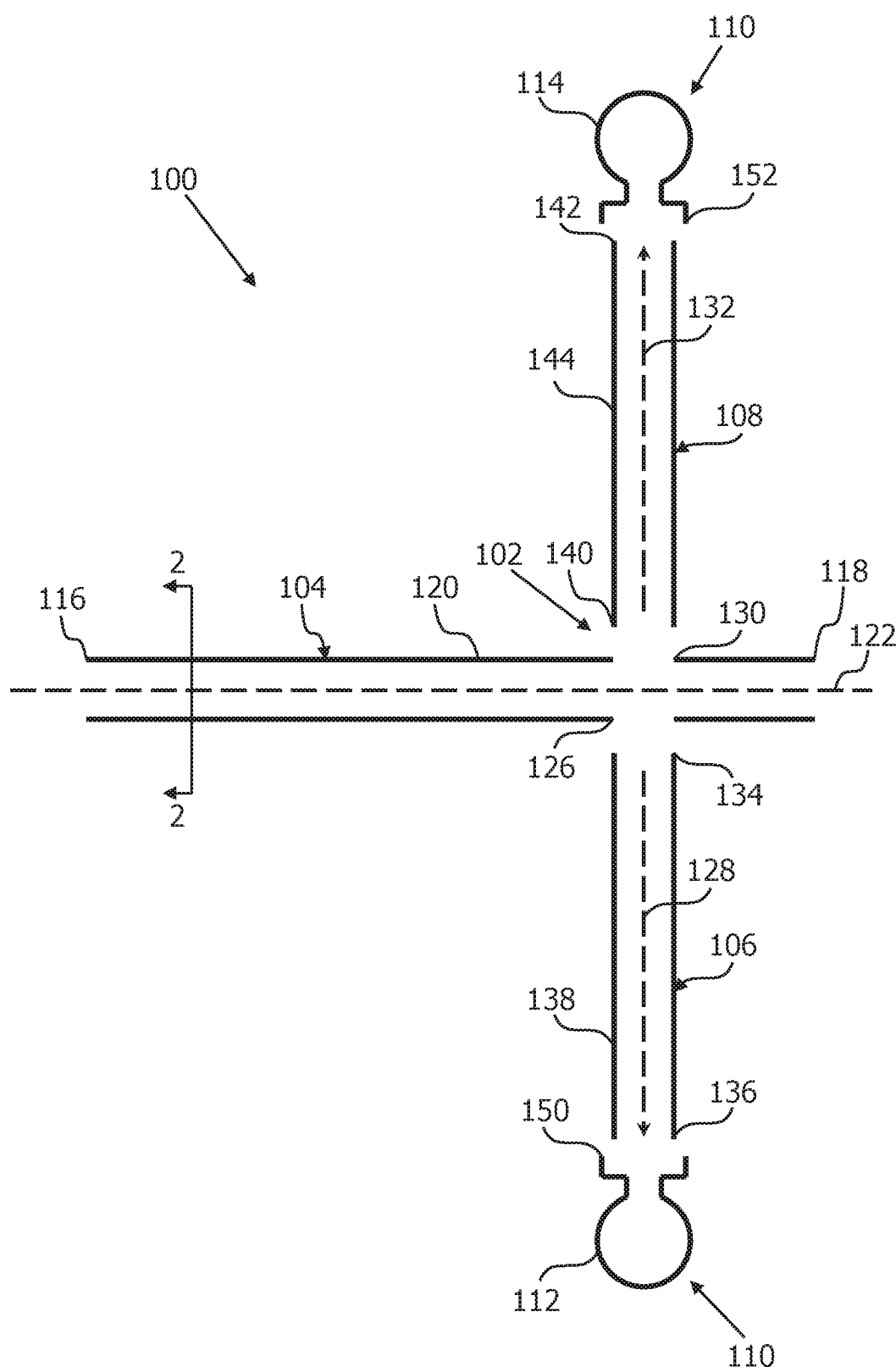
FIG. 1 is a schematic exploded illustration of an exemplary fire suppression sprinkler system.

FIG. 1 is a schematic exploded illustration of an exemplary fire suppression sprinkler system 100. In the exemplary embodiment, fire suppression sprinkler system 100 includes a plurality of elongated hollow components 102, such as pipes. In the exemplary embodiment, the plurality of elongated hollow components includes a hollow component 104, a hollow component 106, and a hollow component 108. Sprinkler system 100 also includes a plurality of sprinkler heads 110 (e.g., a first sprinkler head 112 and a second sprinkler head 114) coupled in flow communication with hollow components 102. In one embodiment, hollow component 104 functions as a main (or feed) line of sprinkler system 100, while hollow component 106 and hollow component 108 function as branch lines of sprinkler system 100. In other embodiments, each hollow component 102 may function as any suitable type of line in sprinkler system 100. Although sprinkler system 100 has three hollow components 102 in the exemplary embodiment, sprinkler system 100 may have any suitable number of hollow components 102 in other embodiments.

In the exemplary embodiment, elongated hollow component 104 has a first end 116, a second end 118, and an elongated hollow body 120 extending between first end 116 and second end 118 along a longitudinal axis 122 that extends from first end 116 to second end 118, such that first end 116 and second end 118 are open ends. Body 120 has a seam 124 (shown in FIG. 2), such as, for example, a welded seam, that extends longitudinally from first end 116 to second end 118, a first aperture 126 facing outward in a first direction 128 adjacent second end 118, and a second aperture 130 facing outward in a second direction 132 adjacent second end 118, wherein first direction 128 is substantially opposite (i.e., oriented substantially 180π away from) second direction 132. Although hollow component 104 has one longitudinally-extending seam 124 and two oppositely-facing apertures 126 and 130 in the exemplary embodiment, hollow component 104 may have any suitable number of seams and/or apertures oriented in any suitable manner in other embodiments. For example, in some embodiments, hollow component 104 may not have seam 124, first aperture 126, and/or second aperture 130 (e.g., hollow component 104 may be seamless in one embodiment). Moreover, although first aperture 126 and second aperture 130 are adjacent second end 118 in the exemplary embodiment, first aperture 126 and second aperture 130 may be defined at any suitable locations along body 120 (e.g., in one embodiment, first aperture 126 may be adjacent first end 116, while second aperture 130 is adjacent second end 118). Additionally, although first end 116 and second end 118 are open ends in the exemplary embodiment, at least one of first end 116 and second end 118 may be a closed end in the other embodiments.

In the exemplary embodiment, hollow component 106 has a first end 134, a second end 136, and an elongated hollow body 138 extending between first end 134 and second end 136 such that first end 134 and second end 136 are open ends. Similarly, hollow component 108 has a first end 140, a second end 142, and an elongated hollow body 144 extending between first end 140 and second end 142 such that first end 140 and second end 142 are open ends. Body 138 of hollow component 106 has a seam (not shown) extending from first end 134 to second end 136, and a body 144 of hollow component 108 likewise has a seam (not shown) extending from first end 140 to second end 142. Notably, in the exemplary embodiment, the seams of hollow component 106 and/or hollow component 108 are the same as seam 124 of hollow component 104 (i.e., the seams of hollow component 106 and/or hollow component 108 are welded seams in the exemplary embodiment). In some embodiments, hollow component 106 may not have a seam (i.e., hollow component 106 may be seamless in one embodiment), and/or hollow component 108 may not have a seam (i.e., hollow component 108 may be seamless in one embodiment). In other embodiments, first end 134 and/or second end 136 of hollow component 106 may be a closed end, and/or first end 140 and/or second end 142 of hollow component 108 may be a closed end.

In the exemplary embodiment, first sprinkler head 112 is coupled to second end 136 of hollow component 106 via a first fitting 150, and second sprinkler head 114 is coupled to second end 142 of hollow component 108 via a second fitting 152. In other embodiments, first sprinkler head 112 may be coupled to hollow component 106 at any suitable location along body 138 of hollow component 106, and second sprinkler head 114 may be coupled to hollow component 108 at any suitable location along body 144 of hollow component 108. Moreover, although each of hollow component 106 and hollow component 108 has only one sprinkler head 110 coupled thereto in the exemplary embodiment, any suitable number of sprinkler heads 110 may be coupled to hollow component 106 and hollow component 108 in other embodiments.

In the exemplary embodiment, when joining hollow component 106 to hollow component 104, hollow component 106 either is mechanically coupled to hollow component 104 at first aperture 126 via a suitable hollow component fitting (not shown), or is alternatively bonded (e.g., welded) directly to hollow component 104 at first aperture 126, such that hollow component 106 extends substantially perpendicular to longitudinal axis 122 of hollow component 104 along first direction 128 adjacent second end 118. Likewise, when joining hollow component 108 to hollow component 104, hollow component 108 either is mechanically coupled to hollow component 104 at second aperture 130 via a suitable hollow component fitting (not shown), or is alternatively bonded (e.g., welded) directly to hollow component 104 at second aperture 130, such that hollow component 108 extends substantially perpendicular to longitudinal axis 122 of hollow component 104 along second direction 132 adjacent second end 118. In other embodiments, hollow component 106 and hollow component 108 may be joined to hollow component 104 in any suitable manner, and may be oriented in any suitable direction, that facilitates enabling sprinkler system 100 to function as described herein.

During operation of fire suppression sprinkler system 100, a liquid (not shown) such as water, for example, flows to first sprinkler head 112 via hollow component 104 and hollow component 106, and to second sprinkler head 114 via hollow component 104 and hollow component 108. In some embodiments, hollow components 102 may be substantially filled with the liquid until sprinkler system 100 is tested or otherwise used to suppress a fire (i.e., the liquid may sit stagnant in hollow components 102, flowing therealong only periodically during a testing event or when used to suppress a fire). In other embodiments, hollow components 102 may be substantially empty (i.e., substantially not filled with liquid) until sprinkler system 100 is tested or otherwise used to suppress a fire (i.e., the liquid may not be supplied to hollow components 102 until a testing event or fire-suppression event occurs). Notably, to facilitate increasing the rate that the liquid flows through hollow components 102 and/or to facilitate reducing pressure loss along hollow components 102, it is desirable to minimize the frictional interaction between the liquid and at least one hollow component 102 (i.e., it is desirable to minimize the surface roughness on the inside of at least one hollow component 102). Moreover, to facilitate increasing the useful life of sprinkler system 100 and to facilitate ensuring proper functionality of sprinkler system 100, it is desirable to minimize the amount of corrosion that occurs within hollow components 102. Additionally, it is desirable to minimize the growth of bacteria and other microbiological organisms within hollow components 102.

Figure 2:
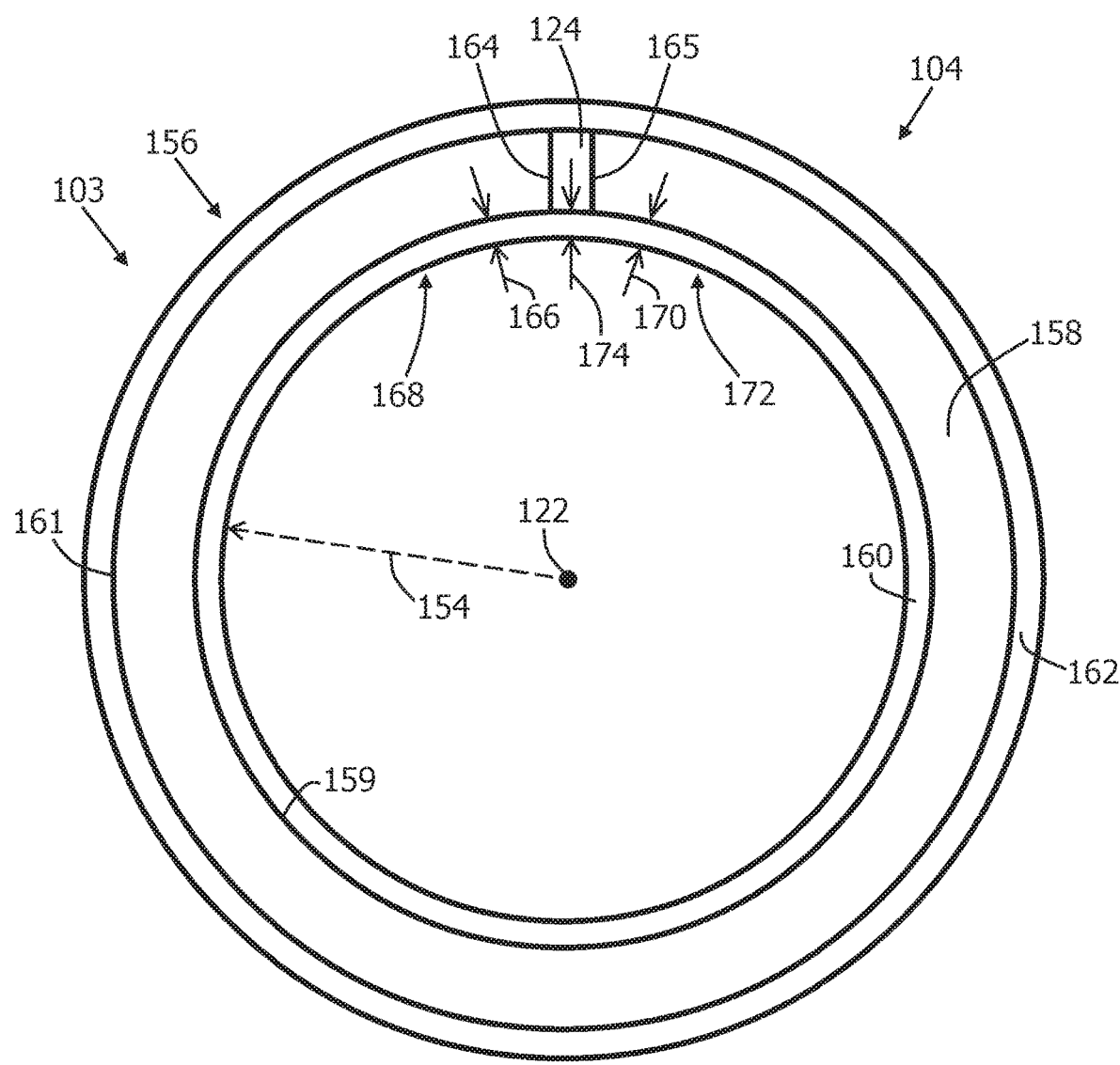
FIG. 2 is a schematic cross-sectional illustration of a hollow component, such as a component of the sprinkler system shown in FIG. 1 and taken along plane 2-2 of FIG. 1.

FIG. 2 is a schematic cross-sectional illustration of first hollow component 104 taken along plane 2-2 of FIG. 1. In the exemplary embodiment, first hollow component 104 has a radius 154 extending outward from longitudinal axis 122, and first hollow component 104 also has a plurality of body layers 156 circumscribing longitudinal axis 122, namely a base layer 158, a radially inner surface coating 160 coupled to a radially inner surface 159 of base layer 158, and optionally a radially outer surface coating 162 coupled to a radially outer surface 161 of base layer 158. Although first hollow component 104 is illustrated as having a tubular body 120 that includes a circular cross-section, in other embodiments first hollow component 104 has any suitable cross-section, such as square, rectangular, triangular, etc. Thus, as used herein, the term "radius" (or any variation thereof) refers to a dimension extending outwardly from a center of any suitable shape (e.g., a square, a rectangle, a triangle, etc.) and is not limited to a dimension extending outwardly from a center of a circular shape. Similarly, as used herein, the term "circumference" (or any variation thereof) refers to a dimension extending around a center of any suitable shape (e.g., a square, a rectangle, a triangle, etc.) and is not limited to a dimension extending around a center of a circular shape.

In the exemplary embodiment, base layer 158 is made from a first steel material (e.g., a carbon (or black) steel material), inner surface coating 160 is made from a second steel material (e.g., a stainless steel material, or alternatively a galvanized steel material), and outer surface coating 162 is made from a third steel material (e.g., a stainless steel material, or alternatively a galvanized steel material) that is optionally the same composition as the second steel material of inner surface coating 160. For example, in one embodiment, base layer 158 may be made from a steel material having a chromium content of less than about 10.5% by mass, and coating(s) 160 and/or 162 may be made from a steel material having a chromium content of at least about 10.5% by mass. Alternatively, base layer 158, inner surface coating 160, and outer surface coating 162 may be made from any suitable steel materials having any suitable comparative chromium content. Moreover, in another embodiment, base layer 158, inner surface coating 160, and/or outer surface coating 162 may not be made from a steel material. In some embodiments, one of inner surface coating 160 and outer surface coating 162 may be made from (or may be at least partly covered in) a non-metallic material such as, for example, a paint material. In other embodiments, first hollow component 104 may not have inner surface coating 160, or may not have outer surface coating 162.

To fabricate first hollow component 104 (and optionally second hollow component 106 and/or third hollow component 108 in the same manner), base layer 158 is provided as a sheet of material that is unrolled from a coil. After it is unrolled from the coil, inner surface coating 160 and/or outer surface coating 162 is applied to base layer 158 (e.g., using a diffusion bonding and/or annealing process). After inner surface coating 160 and/or outer surface coating 162 is applied to base layer 158, base layer 158 is stamped to cut a segment of base layer 158 from the coil, and optionally to define apertures 126 and 130 in the cutaway segment of base layer 158. The cutaway segment of base layer 158 is then rolled into a tubular shape corresponding to a cross-section of hollow component 104, and opposed edges 164 thereof are welded together to define seam 124. In some embodiments, apertures 126 and 130 may alternatively be cut in the field by an installer of fire suppression sprinkler system 100, as opposed to being cut during the fabrication of first hollow component 104. In other embodiments, first hollow component 104 may be fabricated in any suitable manner that facilitates enabling first hollow component 104 to function as described herein.

In the exemplary embodiment, base layer 158 and inner surface coating 160 extend from first end 116 to second end 118 along longitudinal axis 122, such that inner surface coating 160 completely circumscribes longitudinal axis 122 to circumferentially span seam 124. More specifically, inner surface coating 160 has a first thickness 166 on a first side 168 of seam 124, a second thickness 170 on a second side 172 of seam 124, and a third thickness 174 circumferentially between first side 168 and second side 172. In that regard, inner surface coating 160 is substantially uniformly distributed across seam 124 such that first thickness 166, second thickness 170, and third thickness 174 are substantially the same. In some embodiments, an anti-corrosive weld wire (not shown) may be used to weld seam 124 in this manner. In other embodiments, seam 124 may be welded in any suitable manner that facilitates distributing inner surface coating 160 substantially uniformly across seam 124. Notably, to test a thickness of first hollow component 104 (e.g., third thickness 174 of inner surface coating 160) before or after installation of sprinkler system 100, it is contemplated to use ultrasonic testing (UT) techniques and/or corrosion monitoring stations, and/or to remove samples of hollow component(s) 102 from sprinkler system 100 for testing.

In the exemplary embodiment, because inner surface coating 160 is made from a steel material having a higher chromium content, first hollow component 104 is provided with a decreased surface roughness that facilitates a smoother flow of liquid and/or reduced pressure loss therealong, first hollow component 104 is provided with an increased resistance to corrosion, and first hollow component 104 is also provided with a resistance to the growth of bacteria and other microbiological organism. Moreover, because base layer 158 has a lower chromium content than inner surface coating 160, it is possible to fabricate first hollow component 104 with the above-mentioned properties at a reduced cost of manufacture. Although FIG. 1 illustrates only a schematic cross-section of first hollow component 104, it is understood that the configuration of first hollow component 104 illustrated in FIG. 1 is equally useful for second hollow component 106 and/or third hollow component 108 without departing from the scope of this disclosure. Moreover, although the exemplary embodiment includes hollow components in the form of pipes for use in sprinkler system 100, it is also contemplated that hollow components 102 may be fabricated in a similar manner for use in other structures or systems, such as but not limited to: (1) a hollow structural section (HSS) for a building exterior, an oil platform, a trailer body, construction/agricultural equipment, roadway equipment (e.g., roadway signs, guardrails, etc.); (2) at least one component of a healthcare-related device (e.g., a hospital bed, a wheelchair, etc.); (3) at least one component of a piece of equipment for use outdoors (e.g., the handle(s) thereof); (4) at least one component of a piece of outdoor furniture; and (5) at least one component of sporting and/or fitness goods/equipment. Thus, although hollow component 102 is described above with respect to fire suppression sprinkler system 100, other suitable uses for the systems and methods described herein are also contemplated without departing from the scope of this disclosure.

The methods and systems described herein facilitate providing improvements in elongated hollow metal structures such as, for example, metal pipes for fire suppression sprinkler systems. More specifically, the methods and systems facilitate providing elongated hollow structures with an interior surface coating having stainless steel properties. The methods and systems thus facilitate reducing surface roughness, inhibiting corrosion, and inhibiting the growth of bacteria and other microbiological organisms on an interior surface of a hollow structure. As such, the methods and systems facilitate increasing the flow rate of liquids through a hollow structure, and facilitate increasing the useful life of a hollow structure.

Exemplary embodiments of steel coated structures and methods of fabricating the same are described above in detail. The methods and systems described herein are not limited to the specific embodiments described herein, but rather, components of the methods and systems may be utilized independently and separately from other components described herein. For example, the methods and systems described herein may have other applications not limited to practice with sprinkler systems, as described herein. Rather, the methods and systems described herein can be implemented and utilized in connection with various other industries.

While the disclosure has been described in terms of various specific embodiments, those skilled in the art will recognize that the disclosure can be practiced with modification within the spirit and scope of the claims.

What is claimed is:

1. A method of fabricating an elongated hollow component, said method comprising:
   unrolling a sheet of a first steel material from a coil as a sheet;
   coupling an inner surface layer to the unrolled sheet to form a plurality of layers, wherein a base layer is formed from the first steel material and the inner surface layer is formed from a second steel material;

stamping, after said coupling the inner surface layer, the base layer to cut the base layer from the coil; and rolling, after said stamping the base layer, the plurality of layers to form a tubular body of the elongated hollow component, such that the plurality of layers each circumscribe a longitudinal axis extending from a first end to a second end of the body, and the inner surface layer is on a radially inner surface of the base layer and exposed to an interior cavity of the hollow component.

2. The method in accordance with claim 1, wherein said coupling the inner surface layer to the base layer comprises at least one of diffusion bonding and annealing.

3. The method in accordance with claim 1, wherein the first steel material has a greater surface roughness than the second steel material.

4. The method in accordance with claim 1, wherein the second steel material has a higher chromium content than the first steel material.

5. The method in accordance with claim 1, wherein the interior cavity is configured to receive a liquid fluid flow therein and the inner surface layer is configured to direct the liquid fluid flow within the interior cavity between the first end and the second end.

6. The method in accordance with claim 5, wherein the second steel material, after said coupling and before said stamping, has material properties configured to reduce friction of the liquid flow in the interior cavity and inhibit corrosion caused by the liquid flow in the interior cavity.

7. The method in accordance with claim 1, wherein the first steel material has a chromium content of less than 10.5% by mass and the second steel material comprises a chromium content of at least 10.5% by mass.

8. The method in accordance with claim 1, wherein the first steel material is a black steel material and the second steel material is a stainless steel material.

9. The method in accordance with claim 1, wherein the second steel material has an increased resistance to microbiological growth relative to the first steel material.

10. The method in accordance with claim 1 further comprising coupling an outer surface layer to the unrolled sheet, wherein the outer surface layer is formed from a third steel material.

11. The method in accordance with claim 10, wherein the third steel material is one of a stainless steel material and a paint material.

12. The method in accordance with claim 10, wherein said coupling the outer surface layer to the unrolled sheet comprises at least one of diffusion bonding and annealing.

13. The method in accordance with claim 1, wherein said stamping further comprises defining an aperture extending through the base layer and the inner surface layer, the aperture located intermediate the first end and the second end, wherein the aperture is sized after said rolling to receive another elongated hollow body into flow communication with the interior cavity.

14. The method in accordance with claim 1, wherein, prior to said rolling, the base layer extends laterally between a first edge and a second edge, wherein said rolling the plurality of layers further comprises rolling the base layer such that the first edge is opposed to the second edge, said method further comprising welding the first edge to the second edge to define a longitudinal seam in the tubular body.

15. The method in accordance with claim 14, wherein said welding is performed with an anti-corrosive weld wire adjacent said inner surface layer.

* * * * *